(12) United States Patent
Khavin et al.

(10) Patent No.: US 12,743,277 B2
(45) Date of Patent: Sep. 22, 2026

(54) NEURAL NETWORK HARDWARE ACCELERATION VIA SEQUENTIALLY CONNECTED COMPUTATION MODULES

(71) Applicant: EDGECORTIX INC., Tokyo (JP)

(72) Inventors: Oleg Khavin, Tokyo (JP); Nikolay Nez, Tokyo (JP); Sakyasingha Dasgupta, Tokyo (JP)

(73) Assignee: EDGECORTIX INC., Tokyo (JP)

( * ) Notice: Subject to any disclaimer, the term of this patent is extended or adjusted under 35 U.S.C. 154(b) by 842 days.

(21) Appl. No.: 18/067,015

(22) Filed: Dec. 16, 2022

(65) Prior Publication Data

US 2024/0201987 A1 Jun. 20, 2024

(51) Int. Cl.

*G06F 9/30* (2018.01)
*G06F 7/57* (2006.01)
*G06N 3/02* (2006.01)

(52) U.S. Cl.

CPC ............ *G06F 9/30003* (2013.01); *G06F 7/57* (2013.01); *G06N 3/02* (2013.01)

(58) Field of Classification Search

None

See application file for complete search history.

(56) References Cited

U.S. PATENT DOCUMENTS 11,144,822 B1 * 10/2021 Nez .......................... G06N 5/04
2005/0160253 A1 * 7/2005 Lescure .............. G06F 15/8023 712/22
2021/0319076 A1 * 10/2021 Komuravelli ......... G06F 7/5443
2022/0012856 A1 * 1/2022 Chen .................... G06V 30/194
2022/0207345 A1 * 6/2022 Khaitan ................... G06N 3/08

FOREIGN PATENT DOCUMENTS

JP H04237364 A 8/1992

* cited by examiner

*Primary Examiner* — John M Lindlof

(74) *Attorney, Agent, or Firm* — HAUPTMAN HAM, LLP

(57) ABSTRACT

Neural network hardware acceleration is performed by an integrated circuit including sequentially connected computation modules. Each computation module includes a processor and an adder. The processor includes circuitry configured to receive an input data value and a weight value, and perform a mathematical operation on the input data value and the weight value to produce a resultant data value. The adder includes circuitry configured to receive the resultant data value directly from the processor, receive one of a preceding resultant data value and a preceding sum value directly from a preceding adder of a preceding computation module, add the resultant data value to the one of the preceding resultant data value and the preceding sum value to produce a sum value, and transmit one of the resultant data value and the sum value to the memory or directly to a subsequent adder of a subsequent computation module.

14 Claims, 9 Drawing Sheets

NEURAL NETWORK HARDWARE ACCELERATION VIA SEQUENTIALLY CONNECTED COMPUTATION MODULES

BACKGROUND

The cost of computational power is becoming cheaper as more and more computational resources become packed into chips, such as integrated circuits. However, the full computational power of given chip is not always utilized for every task. Therefore, in situations where a single chip is assigned multiple types of tasks, the chip may be designed with computational resources that accommodate the most resource-demanding among its tasks. That particular design may not be efficient for performance of the other tasks, and so there is potential for performance that is lost. This is particularly true for accelerator chips configured to perform different types of neural network inference.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
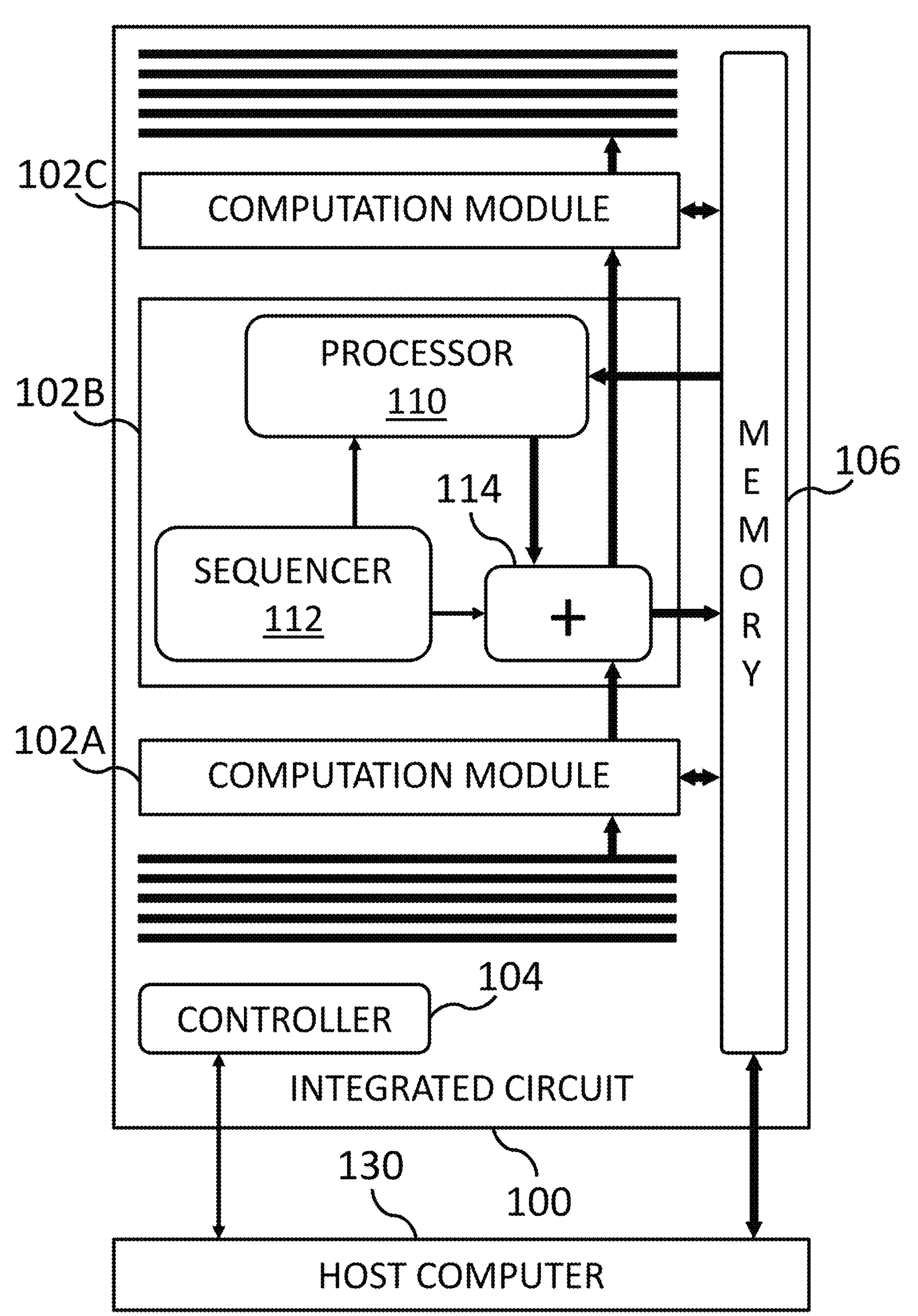
FIG. 1 is a schematic diagram of a system for neural network hardware acceleration via sequentially connected computation modules, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Various degrees of parallelism exist in performance of neural network inference, which can be exploited to increase computation efficiency. In particular, a simple task performed by a chip with many computational resources can utilize more of its resources through parallelism. However, the highest performance chips will have a fixed architecture optimized to take advantage of a limited number of the available degrees of parallelism, and will not be able to efficiently support all degrees of parallelism. Thus, performance of a simple task on a powerful chip may lead to low computational resource utilization, and low performance and power efficiency.

On the other hand, chips capable of complete architecture reconfiguration, such as field-programmable gate arrays (FPGAs), exist. Such chips are capable of being reconfigured for each specific task. However, the resources required to actually reconfigure such chips often exceed the resource savings in utilizing all computational resources during the task. Moreover, FPGAs provide high flexibility due to fine-grained reconfigurability, but this limits their peak compute performance compared to application-specific integrated circuits (ASICs) for a similar chip size.

Coarse-grained parallel reconfigurability can be achieved through "reduction interconnects" between computation modules and adders. These interconnects enable, for every computation module, direct access to the memory or going through a selected adder. Such configurations enable computation of multiple input channel tiles in parallel, provided that the computation modules are working fully synchronously under control of a common sequencer. Such configurations are set in a circuit-switched manner before starting inference, and, by utilizing select signals to control connectivity, the configuration of the reduction interconnects can be reconfigured during inference.

Coarse-grained parallel reconfigurability can also be achieved through a line buffer and "reduction interconnects" between the memory and computation modules. Such configurations enable parallelism in a kernel row dimension by increasing utilization with multiple computation modules. Such configurations are utilized to determine which index of the line buffer, which corresponds to an index in kernel row, is fed to each computation module.

However, as the number of computation modules of an accelerator increase, the length and number of connections between the computation modules and the line buffer or adders increase. Large numbers of connections may complicate fabrication in the case of Application Specific Integrated Circuits (ASIC), and the speed of an accelerator is limited by the length of the connections. As the length of the connections increases, clock periods must be increased to allow sufficient time for values to be transmitted through the connection, and speed varies inversely with clock period.

At least some embodiments described herein reduce the length and number of connections by sequentially connected computation modules. In at least some embodiments, synchronizations instructions are transmitted in a low-bit sync chain between synchronization units of adjacent computation modules instead of a single sequencer passing wide control instructions directly to each computation module. In at least some embodiments, programs for neural network inference cause a start delay for certain computation modules in the sequential chain in an input tile parallelism mode and in a kernel row parallelism mode. In at least some embodiments, programs for neural network inference cause a simultaneous start for certain computation modules in the sequential chain in a data broadcasting mode. In at least some embodiments, the "reduction interconnect approach" is replaced by a "daisy-chain" approach to reduce the number and length of connections. In at least some embodiments, a single circuitry design of an adder-included computation module is replicable to fabricate an accelerator including any number of computation modules.

FIG. 1 is a schematic diagram of system for neural network hardware acceleration via sequentially connected computation modules, according to at least one embodiment of the present invention. The system includes integrated circuit 100 connected and host computer 130.

Integrated circuit 100 includes a plurality of sequentially connected computation modules, including computation module 102A, computation module 102B, and computation module 102C, a controller 104, and a memory 106. In at least some embodiments, integrated circuit 100 is an Application Specific Integrated Circuit (ASIC), including dedicated circuitry. In at least some embodiments, integrated circuit is a Field Programmable Gate Array (FPGA).

In at least some embodiments, the plurality of sequentially connected computation modules are connected in series, wherein adjacent computation modules are connected via one or more data paths and one or more control paths. In at least some embodiments, adjacent computation modules are connected via a single data path and a single control path. In at least some embodiments, the data paths are unidirectional, meaning data only flows in one direction through the sequentially connected computation modules. For example, computation module 102A is configured to transmit data via one or more data paths to computation module 102B, but computation module 102B is not configured to transmit data to computation module 102A. Likewise, computation module 102B is configured to transmit data via one or more data paths to computation module 102C, but computation module 102C is not configured to transmit data to computation module 102B. In at least some embodiments, the control paths are bidirectional, meaning control signals may flow in either direction through the sequentially connected computation modules. For example, computation module 102A is configured to transmit control signals via one or more control paths to computation module 102B, and computation module 102B is configured to transmit control signals via the same one or more controls paths to computation module 102A. Likewise, computation module 102B is configured to transmit control signals via one or more control paths to computation module 102C, and computation module 102C is configured to transmit control signals via the same one or more controls paths to computation module 102B.

Computation module 102B is representative of each computation module among the plurality of computation modules. Computation module 102B includes a processor 110, a sequencer 112, and an adder 114. In at least some embodiments, processor 110 includes circuitry configured to perform mathematical operations on values according to a program for neural network inference. In at least some embodiments, processor 110 is configured to perform convolution operations, such as point-wise convolution or depth-wise convolution. In at least some embodiments, the mathematical operation is performed on an input data value and a weight value to produce a resultant value. In at least some embodiments, processor 110 is connected to memory 106, and is configured to receive input data values and weight values from memory 106. In at least some embodiments, processor 110 is configured to transmit resultant values to adder 114.

In at least some embodiments, sequencer 112 is connected via control paths to processor 110, adder 114, and controller 104. In at least some embodiments, sequencer 112 includes circuitry configured to cause processor 110 and adder 114 to transmit, receive, and perform operations according to a program, such as a program including instructions for neural network inference. In at least some embodiments, sequencer 112 includes circuitry configured to receive instructions of the program from controller 104.

In at least some embodiments, adder 114 includes circuitry configured to add resultant data values and sum values. In at least some embodiments, adder 114 includes circuitry configured to receive resultant data values directly from processor 110, receive preceding resultant data values and preceding sum values directly from a preceding adder of computation module 102A. In at least some embodiments, adder 114 includes circuitry configured to add a resultant data value received from processor 110 to one of a preceding resultant data value and a preceding sum value to produce a sum value received from a preceding adder of computation module 102A. In at least some embodiments, adder 114 includes circuitry configured to transmit resultant data values and sum values to memory 106 or directly to a subsequent adder of computation module 102C. In at least some embodiments, adder 114 is directly connected to processor 110, the preceding adder of computation module 102A, and the subsequent adder of computation module 102C, and is connected to memory 106 through a memory interconnect.

Controller 104 is connected to host computer 130 and to each computation module among the plurality of sequentially connected computation modules. In at least some embodiments, controller 104 includes circuitry configured to receive programs from host computer 130, such as programs including instruction for performing neural network inference. In at least some embodiments, controller 104 includes circuitry configured to transmit the program to the sequencer of each computation module among the plurality of sequentially connected computation modules. In at least some embodiments, controller 104 transmits instructions applicable to all computation modules. In at least some embodiments, controller 104 transmits instructions applicable to only some computation modules. For example, a program that utilizes less than all of the plurality of sequentially connected computation modules will not include instructions for all computation modules. In at least some embodiments, the format of the program received from host computer 130 is ready for transmission to the sequencers of the plurality of computation modules. In at least some embodiments, the format of the program received from host computer 130 is converted by controller 104 before transmission to the sequencers of the plurality of computation modules. In at least some embodiments, controller 104 stores instructions of the program applicable to controller 104 and transmits remaining instructions to the sequencers of the computation module.

In at least some embodiments, memory 106 is configured to store values and to transmit stored values. In at least some embodiments, memory 106 includes one or more banks or blocks of volatile data storage, such as Random Access Memory (RAM), Embedded System Blocks (ESB), Content Addressable Memory (CAM), etc. In at least some embodiments, memory 106 is distributed throughout integrated circuit 100. In at least some embodiments, memory 106 is connected to each computation module via one or more data paths, such as an interconnect or data bus. In at least some embodiments, memory 106 is configured to transmit input data values through data paths to processors of computation modules, and is configured to receive resultant data values and sum values through data paths from adders of computation modules.

In at least some embodiments, host computer 130 is a personal computer, a server, a portion of cloud computing resources, or anything else capable of transmitting program instructions to integrated circuit 100 and storing resultant data. In at least some embodiments, host computer 130 is a notebook computer, a tablet computer, a smartphone, a smartwatch, an Internet of Things (IOT) device, etc. Host computer 130 is connected to integrated circuit 100 through a control path and a data path. In at least some embodiments, host computer 130 includes an external memory, such as a Dynamic Random Access Memory (DRAM) configured to store programs, input data, and resultant data.

Figure 2:
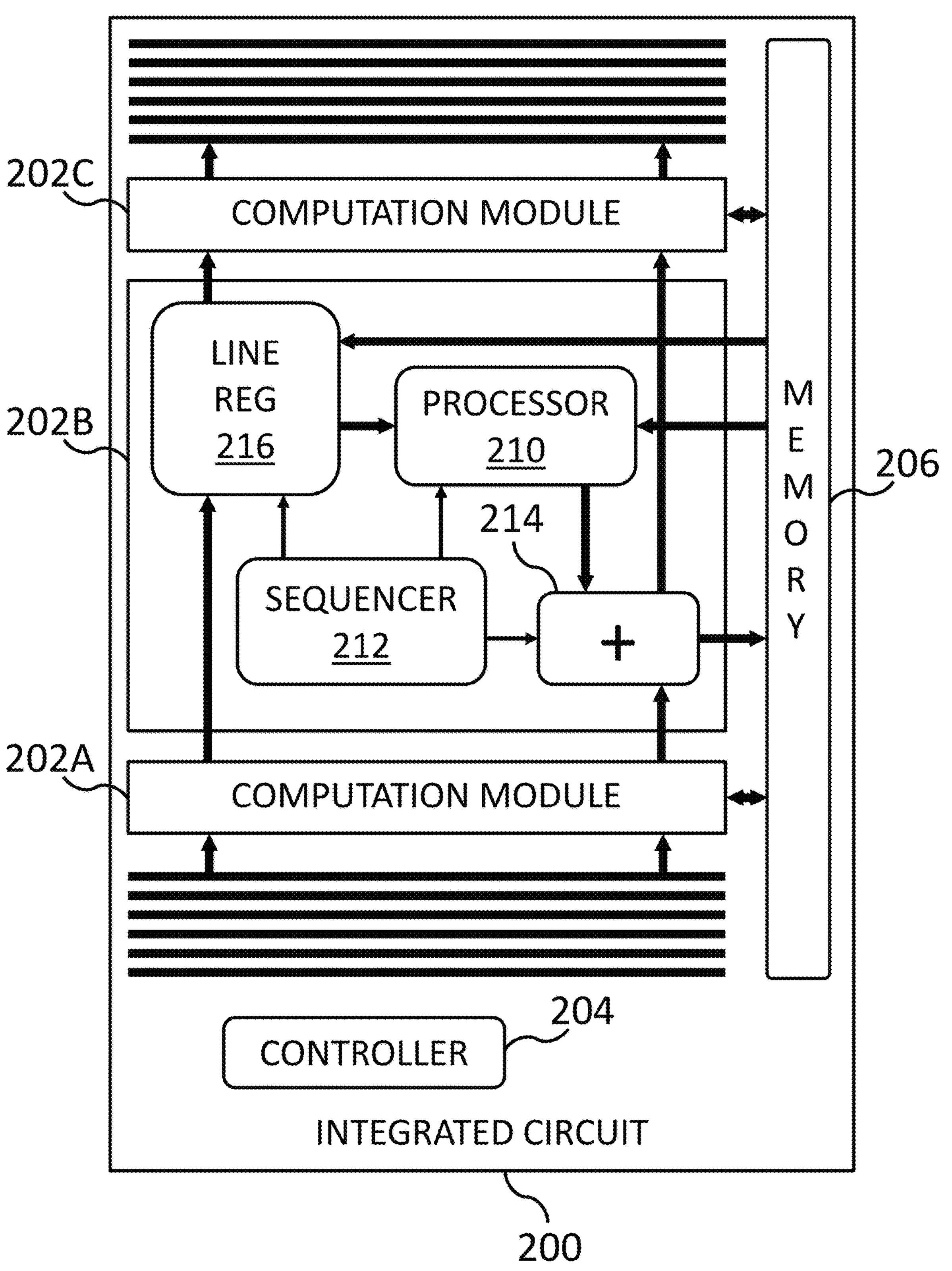
FIG. 2 is a schematic diagram of an integrated circuit for neural network hardware acceleration via sequentially connected computation modules including line registers, according to at least one embodiment of the present invention.

FIG. 2 is a schematic diagram of integrated circuit 200 for neural network hardware acceleration via sequentially connected computation modules including line registers, according to at least one embodiment of the present invention. Integrated circuit 200 includes a plurality of sequentially connected computation modules, including computation module 202A, computation module 202B, and computation module 202C, a controller 204, and a memory 206. The plurality of sequentially connected computation modules of integrated circuit 200, including computation module 202A, computation module 202B, and computation module 202C, controller 204, and memory 206, are substantially similar in structure and function to the plurality of sequentially connected computation modules of integrated circuit 100, including computation module 102A, computation module 102B, and computation module 102C, controller 104, and memory 106 of FIG. 1, respectively, except where described otherwise.

Computation module 202B is representative of each computation module among the plurality of computation modules. Computation module 202B includes a processor 210, a sequencer 212, an adder 214, and a line register 216. Processor 210, sequencer 212, and adder 214 are substantially similar in structure and function to processor 110, sequencer 112, and adder 114 of FIG. 1, respectively, except where described otherwise.

In at least some embodiments, line register 216 includes circuitry configured to receive input data values from memory 206 or directly from a preceding line register of computation module 202A. In at least some embodiments, line register 216 includes circuitry configured to transmit input data values directly to processor 210 or a subsequent line register of computation module 202C. In at least some embodiments, line register 216 is directly connected to processor 210, the preceding line register, and the subsequent line register, and is connected to memory 206 through a memory interconnect. In at least some embodiments, line register 216 is configured to receive multiple input data values from memory 206, transmit at least one input data values to processor 210, and transmit other input data values among the multiple input data values to the subsequent line register of computation module 202C. In at least some embodiments, line register 216 is configured to receive multiple input data values from the preceding line register of computation module 202A, transmit at least one input data value to processor 210, and transmit other input data values among the multiple input data values to the subsequent line register of computation module 202C.

In at least some embodiments, processor 210 is connected via a data path to line register 216, and is configured to receive input data from line register 216. In at least some embodiments, sequencer 212 is connected via a control path to line register 216, and is configured to cause line register 216 to transmit, receive, and perform operations according to a program, such as a program including instructions for neural network inference. In at least some embodiments, sequencer 212 further includes circuitry configured to cause the line register to transmit and receive according to the program.

In at least some embodiments, each computation module is substantially similar to computation module 202B, but without adder 214. Such embodiments may be utilized where result merging is not necessary.

Figure 3:
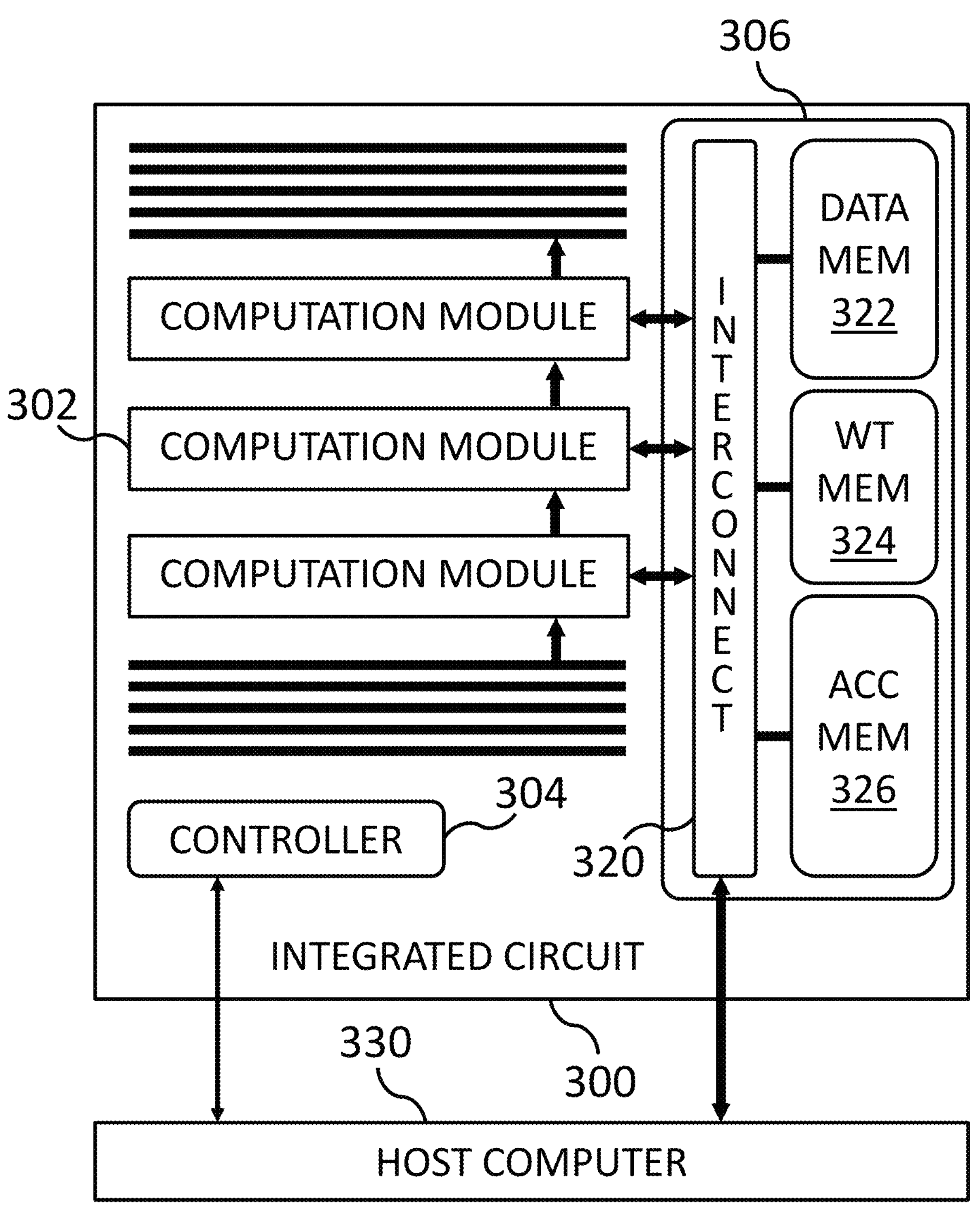
FIG. 3 is a schematic diagram of an integrated circuit for neural network hardware acceleration via sequentially connected computation modules in which the memory includes a plurality of memory banks, according to at least one embodiment of the present invention.

FIG. 3 is a schematic diagram of an integrated circuit 300 for neural network hardware acceleration via sequentially connected computation modules in which the memory includes a plurality of memory banks, according to at least one embodiment of the present invention. Integrated circuit 300 includes a plurality of sequentially connected computation modules, including computation module 302, a controller 304, and a memory 306. The plurality of sequentially connected computation modules of integrated circuit 300, including computation module 302, controller 304, and memory 306, are substantially similar in structure and function to the plurality of sequentially connected computation modules of integrated circuit 200, including computation module 202A, computation module 202B, and computation module 202C, controller 204, and memory 206 of FIG. 2, respectively, except where described otherwise. Host computer 330 is substantially similar in structure and function to host computer 130 of FIG. 1 except where described otherwise.

Memory 306 includes a memory interconnect 320, and a plurality of memory banks, such as input data memory bank 322, weight memory bank 324, and accumulation memory bank 326. In at least some embodiments, the plurality of memory banks include multiple input data memory banks, multiple weight memory banks, and multiple accumulation memory banks. In at least some embodiments, the memory banks are not dedicated to storing a single type of value, such as input data values, weight values, and accumulation values. In at least some embodiments, memory 306 is divided into portions other than banks, such as blocks, etc. In at least some embodiments, one or more blocks can be combined to form a single bank or virtual block. In at least some embodiments, memory interconnect 320 selectively connects a memory bank among the plurality of memory banks, such as input data memory bank 322, weight memory bank 324, or accumulation memory bank 326, to a computation module among the plurality of sequentially connected computation modules, such as computation module 302, or a host computer, such as host computer 330.

In at least some embodiments, controller 304 includes circuitry configured to, in accordance with a program, cause memory 306 to store a first input data value received from host computer 330 in a first memory bank, such as input data memory bank 322. In at least some embodiments, controller 304 is further configured to cause memory 306 to store a second input data value received from host computer 330 in a second memory bank, such as input data memory bank 322 or another input data memory bank, and cause memory 306 to store a weight value received from host computer 330 in a third memory bank, such as weight memory bank 324.

Figure 4:
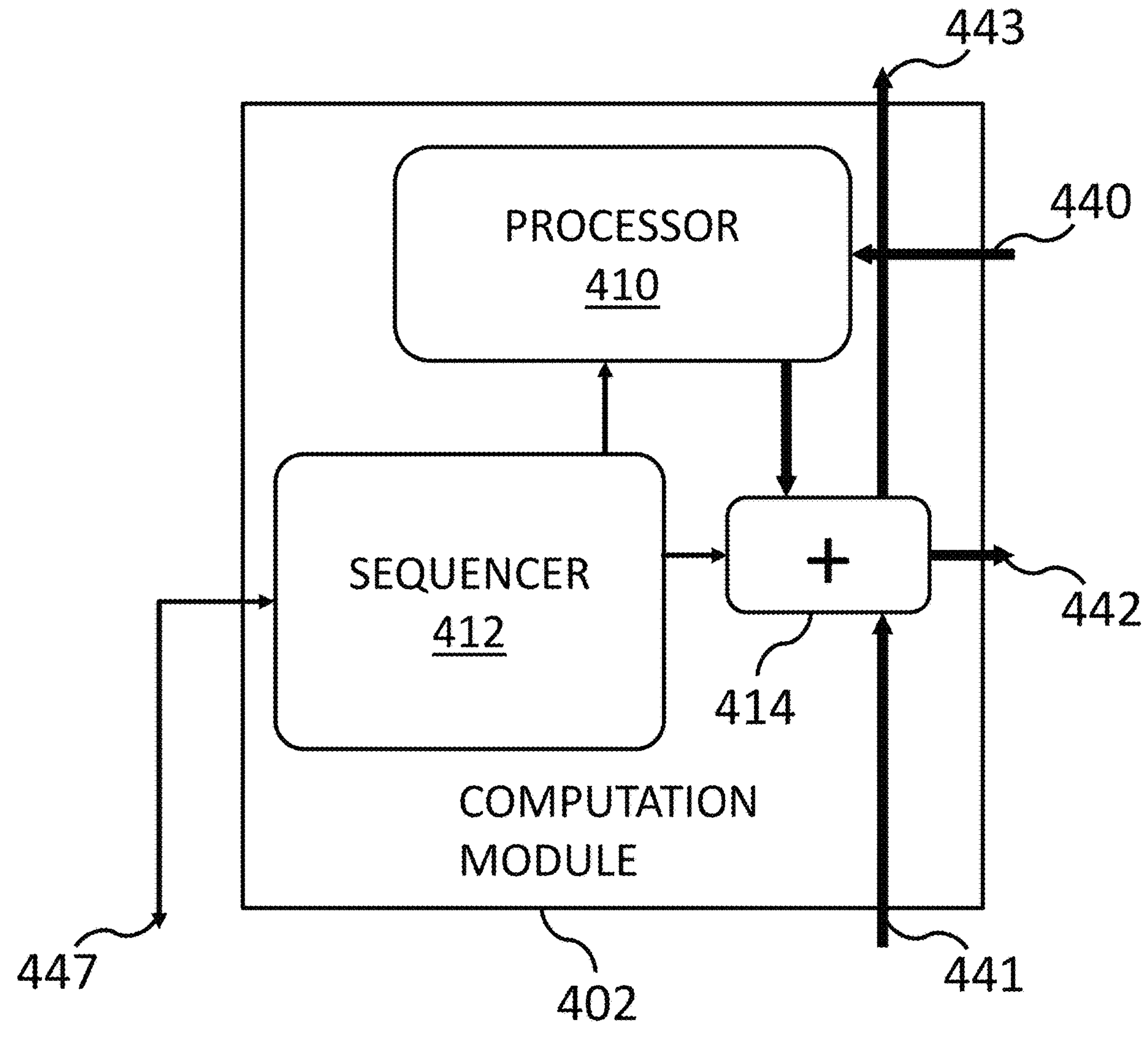
FIG. 4 is a schematic diagram of a sequentially connected computation module for an integrated circuit for neural network hardware acceleration, according to at least one embodiment of the present invention.

FIG. 4 is a schematic diagram of a sequentially connected computation module 402 for an integrated circuit for neural network hardware acceleration, according to at least one embodiment of the present invention. In at least some embodiments, computation module 402 is a portion of an integrated circuit including a plurality of sequentially connected computation modules of identical structure. Computation module 402 includes processor 410, sequencer 412, adder 414, input data paths 440 and 441, output data paths 442 and 443, and bidirectional control path 447. Processor 410, sequencer 412, and adder 414, are substantially similar in structure and function to processor 210, sequencer 212, and adder 214 of FIG. 2, respectively, except where described otherwise.

Data paths 440, 441, 442, and 443 are paths of electronic communication configured for data signal transmission. In at least some embodiments, data paths 440, 441, 442, and 443 are configured for higher bit-width transmission. In at least some embodiments, input data path 440 is connectable to a memory. In at least some embodiments, processor 410 is directly connected downstream of input data path 440, and includes circuitry configured to perform a convolution operation. In at least some embodiments, input data path 441 is directly connectable to a preceding adder, such as an adder of a preceding computation module among the plurality of sequentially connected computation modules of an integrated circuit. In at least some embodiments, adder 414 is directly connected downstream of processor 410 and input data path 441, and includes circuitry configured to add. In at least some embodiments, output data path 442 is directly connected downstream of adder 414, and is connectable to the memory. In at least some embodiments, output data path 443 is directly connected downstream of adder 414 and is directly connectable to a subsequent adder, such as an adder of a subsequent computation module among the plurality of sequentially connected computation modules of an integrated circuit.

Control path 447 is a path of electronic communication configured for control signal transmission. In at least some embodiments, bidirectional control path 447 is connectable to a controller. In at least some embodiments, sequencer 412 is directly connected downstream of bidirectional control path 447, and is configured to transmit signals to processor 410 and adder 414 according to a program, such as a program for neural network inference.

Figure 5:
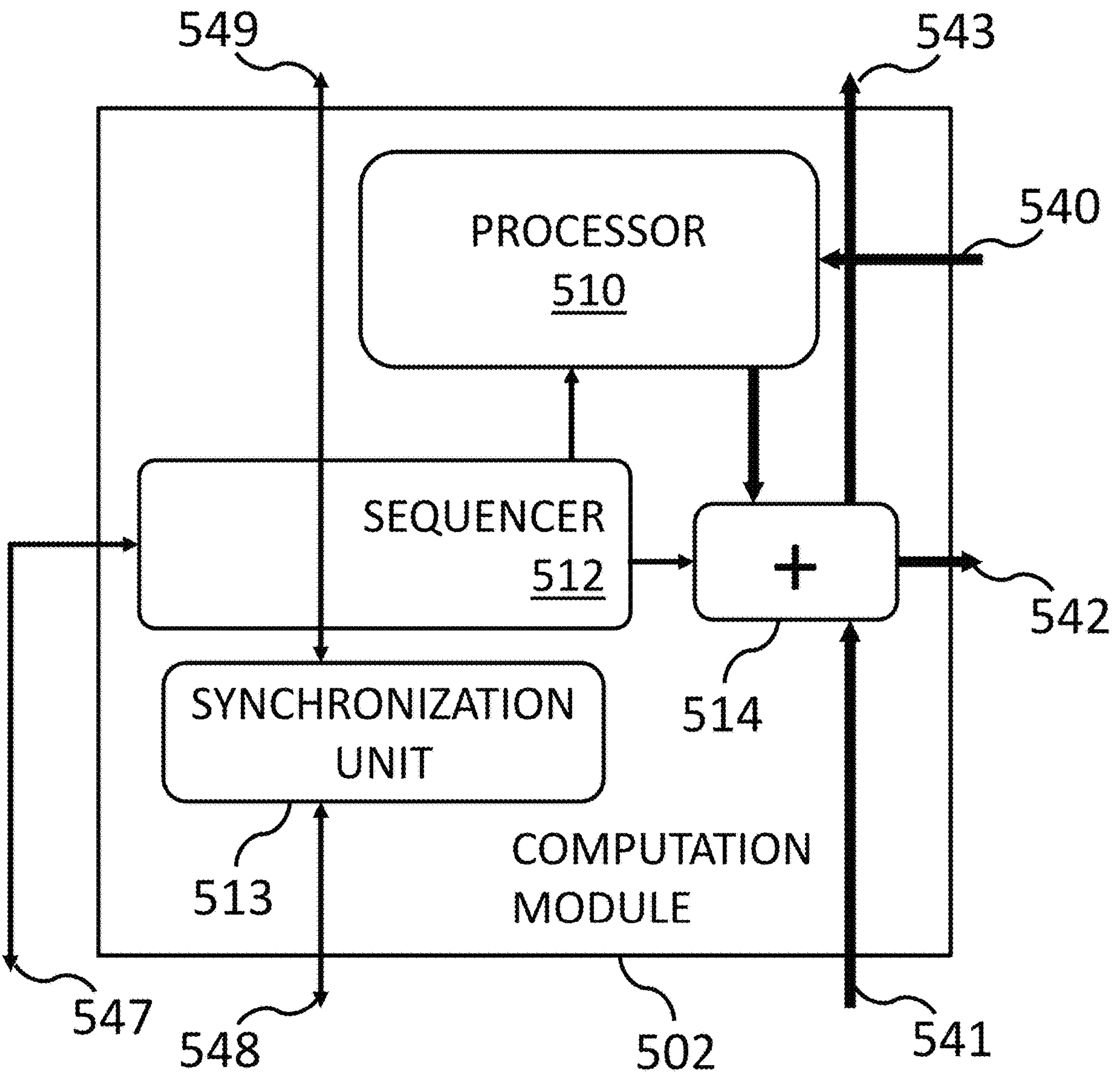
FIG. 5 is a schematic diagram of a sequentially connected computation module including a synchronization unit for an integrated circuit for neural network hardware acceleration, according to at least one embodiment of the present invention.

FIG. 5 is a schematic diagram of a sequentially connected computation module 502 including a synchronization unit 513 for an integrated circuit for neural network hardware acceleration, according to at least one embodiment of the present invention. In at least some embodiments, computation module 502 is a portion of an integrated circuit including a plurality of sequentially connected computation modules of identical structure. Computation module 502 includes processor 510, sequencer 512, synchronization unit 513, adder 514, input data paths 540 and 541, output data paths 542 and 543, and bidirectional control paths 547, 548, and 549. Processor 510, sequencer 512, adder 514, input data paths 540 and 541, output data paths 542 and 543, and bidirectional control path 547, are substantially similar in structure and function to processor 410, sequencer 412, adder 414, input data paths 440 and 441, output data paths 442 and 443, and bidirectional control paths 447 of FIG. 4, respectively, except where described otherwise.

In at least some embodiments, synchronization unit 513 includes circuitry configured to synchronize a data reading operation with a subsequent synchronization unit of the subsequent computation module, whereby processor 510 and a subsequent processor of the subsequent computation module receive one of an input data value and a weight value in a single transmission from a memory within a single clock period. Synchronization unit 513 is connected to bidirectional control paths 548 and 549. Control paths 548 and 549 are paths of electronic communication configured for control signal transmission. In at least some embodiments, control paths 548 and 549 are configured for lower bit-width transmission, such as lower bit-width transmission than data paths 540, 541, 542, and 543. In at least some embodiments, control paths 548 and 549 are configured for 2-bit transmission. In at least some embodiments, bidirectional control path 548 is directly connectable to a preceding sequencer, such as a sequencer of a preceding computation module among the plurality of sequentially connected computation modules of an integrated circuit. In at least some embodiments, bidirectional control path 549 is directly connectable to a subsequent sequencer, such as a sequencer of a subsequent computation module among the plurality of sequentially connected computation modules of an integrated circuit. In at least some embodiments, synchronization unit 513 is connected to bidirectional control paths 548 and 549, and utilizes bidirectional control paths 548 and 549 to synchronize data reading operations with the preceding synchronization unit, the subsequent synchronization unit, or other synchronization units. In at least some embodiments, a synchronized data reading operation occurs among two or more computation modules, during which the synchronization unit of a master computation module controls synchronization units of all other computation modules among the two or more computation modules involved. In at least some embodiments, synchronization unit 513 includes circuitry configured to transmit and receive signals through bidirectional control path 548 and bidirectional control path 549 in order to synchronize a data reading operation with at least one of a preceding synchronization unit or a subsequent synchronization unit, whereby processor 510 and at least one of a preceding processor and a subsequent processor receive a single transmission from the memory within a single clock period.

In at least some embodiments, each computation module is substantially similar to computation module 502, but without adder 514, input data path 541, and output data path 543. Such embodiments may be utilized where result merging is not necessary.

Figure 6:
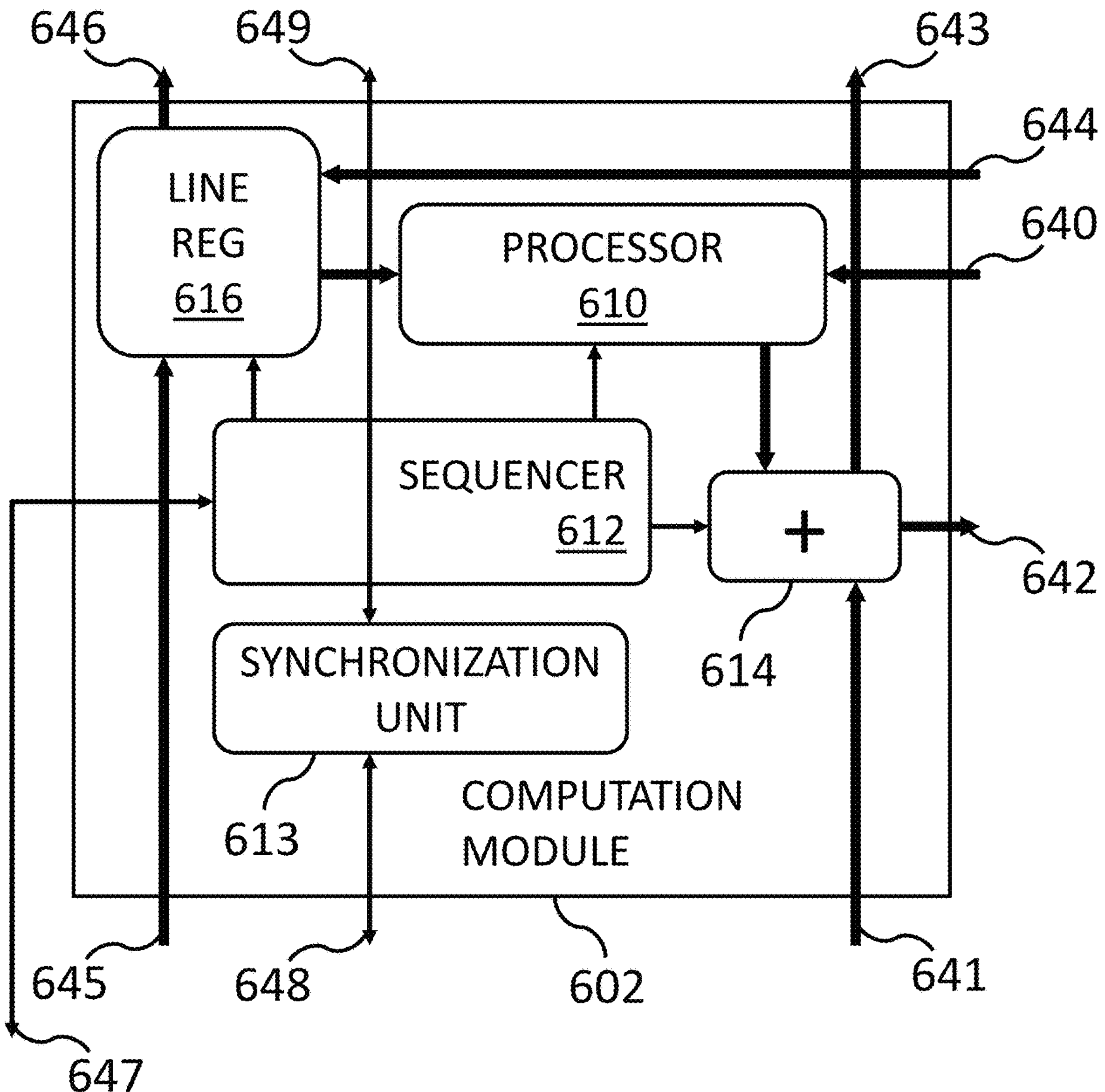
FIG. 6 is a schematic diagram of a sequentially connected computation module including a line register for an integrated circuit for neural network hardware acceleration, according to at least one embodiment of the present invention.

FIG. 6 is a schematic diagram of a sequentially connected computation module 602 including a line register 616 for an integrated circuit for neural network hardware acceleration, according to at least one embodiment of the present invention. In at least some embodiments, computation module 602 is a portion of an integrated circuit including a plurality of sequentially connected computation modules of identical structure. Computation module 602 includes processor 610, sequencer 612, synchronization unit 613, adder 614, line register 616, input data paths 640, 641, 644, and 645, output data paths 642, 643, and 646, and bidirectional control paths 647, 648, and 649. Processor 610, sequencer 612, synchronization unit 613, adder 614, input data paths 640 and 641, output data paths 642 and 643, and bidirectional control paths 647, 648, and 649, are substantially similar in structure and function to processor 510, sequencer 512, synchronization unit 513, adder 514, input data paths 540 and 541, output data paths 542 and 543, and bidirectional control paths 547, 548, and 549 of FIG. 5, respectively, except where described otherwise. Line register 616 is substantially similar in structure and function to line register 216 of FIG. 2 except where described otherwise.

In at least some embodiments, input data path 644 is connectable to the memory. In at least some embodiments, input data path 645 is directly connectable to a preceding line register, such as a line register of a preceding computation module among the plurality of sequentially connected computation modules of an integrated circuit. In at least some embodiments, line register 616 is directly connected downstream of input data path 644 and input data path 645. In at least some embodiments, output data path 646 is directly connected downstream of line register 616, and is connectable to a subsequent line register, such as a line register of a subsequent computation module among the plurality of sequentially connected computation modules of an integrated circuit.

In at least some embodiments, each computation module is substantially similar to computation module 602, but without adder 614, input data path 641, and output data path 643. Such embodiments may be utilized where result merging is not necessary.

Figure 7:
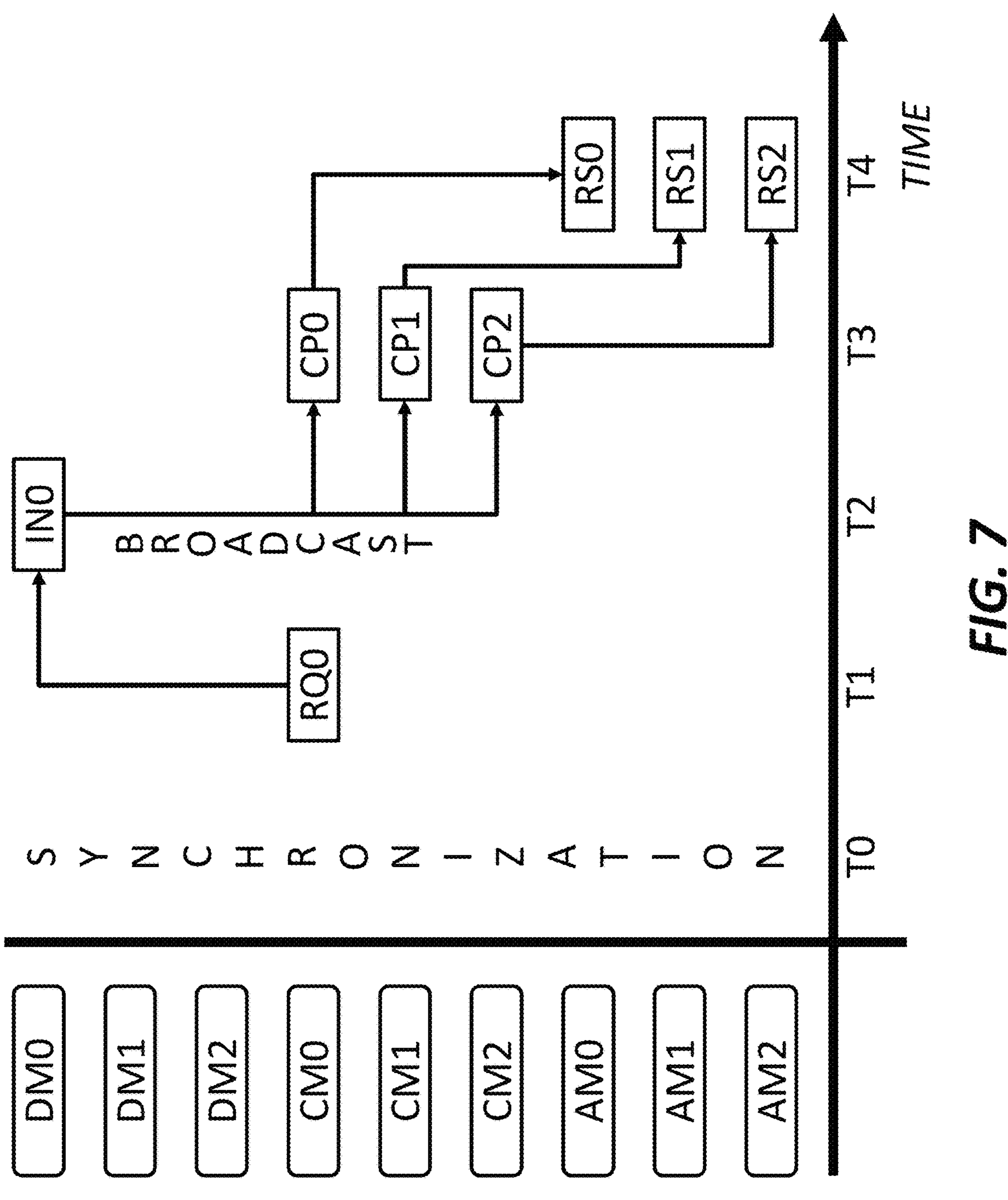
FIG. 7 is a timeline of a program for neural network hardware acceleration in which data broadcasting is performed, according to at least one embodiment of the present invention.

FIG. 7 is a timeline of a program for neural network hardware acceleration in which data broadcasting is performed, according to at least one embodiment of the present invention. In at least some embodiments, a controller of an integrated circuit receives the program from a host computer, and transmits instructions of the program to a plurality of computation modules, which execute the program along with the controller to perform neural network inference. The timeline is arranged in steps of time from T0 to T4. Each step of T0, T1, T2, T3, and T4 represents one or more clock periods of an integrated circuit. The integrated circuit includes at least a first input data memory bank DM0, a second input data memory bank DM1, a third input data memory bank DM2, a first computation module CM0, a second computation module CM1, a third computation module CM2, a first accumulation memory bank AM0, a second accumulation memory bank AM1, and a third accumulation memory bank AM2. At each step of time, one or more elements of the integrated circuit perform operations.

In an initial time step TO, a synchronization operation is performed. In at least some embodiments, the synchronization operation includes adjusting timing of the elements of the integrated circuit so that the elements perform operations in synchronization with the clock period(s) of each step of time.

In a first time step T1, first computation module CM0 requests a first input data value from first input data memory bank DM0, in accordance with an operation RQ0 of the program.

In a second time step T2 immediately subsequent to the first time step T1, first input data memory bank DM0 broadcasts the first input data value to first computation module CM0, second computation module CM1, and third computation module CM2, in accordance with operation IN0 of the program. In at least some embodiments, the data broadcast operation in the second time step T2 is enabled by synchronization units of first computation module CM0, second computation module CM1, and third computation module CM2 to simultaneously receive the single transmission of the first input data value from first input data memory bank DM0.

In a third time step T3 immediately subsequent to the second time step T2, first computation module CM0 performs a computation on the first input data value in accordance with operation CP0 of the program and transmits a first resultant value to first accumulation memory AM0, second computation module CM1 performs a computation on the first input data value in accordance with operation CP1 of the program and transmits a second resultant value to second accumulation memory AM1, and third computation module CM2 performs a computation on the first input data value in accordance with operation CP2 of the program and transmits a third resultant value to third accumulation memory AM2.

In a fourth time step T4 immediately subsequent to the third time step T3, first accumulation memory AM0 stores the first resultant value received from first computation module CM0 in accordance with operation RS0, second accumulation memory AM1 stores the second resultant value received from second computation module CM1 in accordance with operation RS1, and third accumulation memory AM2 stores the third resultant value received from third computation module CM2 in accordance with operation RS2.

Figure 8:
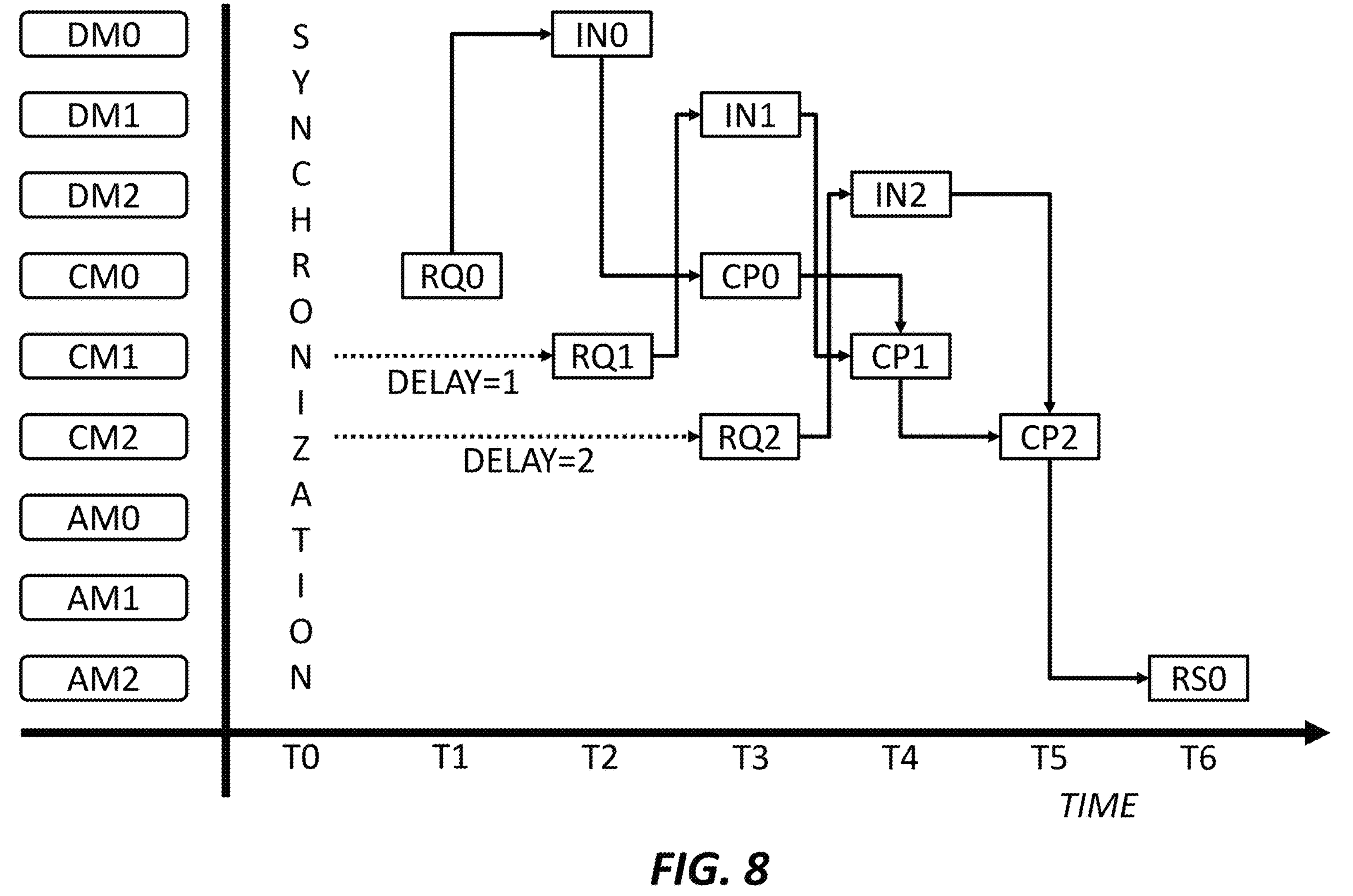
FIG. 8 is a timeline of a program for neural network hardware acceleration in which input tile parallelism is performed, according to at least one embodiment of the present invention.

FIG. 8 is a timeline of a program for neural network hardware acceleration in which input tile parallelism is performed, according to at least one embodiment of the present invention. In at least some embodiments, a controller of an integrated circuit receives the program from a host computer, and transmits instructions of the program to a plurality of computation modules, which execute the program along with the controller to perform neural network inference. The timeline is arranged in steps of time from T0 to T6. Each step of TO, T1, T2, T3, T4, T5, and T6 represents one or more clock periods of an integrated circuit. The integrated circuit includes at least a first input data memory bank DM0, a second input data memory bank DM1, a third input data memory bank DM2, a first computation module CM0, a second computation module CM1, a third computation module CM2, a first accumulation memory bank AM0, a second accumulation memory bank AM1, and a third accumulation memory bank AM2. At each step of time, one or more elements of the integrated circuit perform operations.

In an initial time step T0, a synchronization operation is performed. In at least some embodiments, the synchronization operation includes adjusting timing of the elements of the integrated circuit so that the elements perform operations in synchronization with the clock period of each step of time.

In a first time step T1, first computation module CM0 requests a first input data value from first input data memory bank DM0, in accordance with an operation RQ0 of the program.

In a second time step T2 immediately subsequent to the first time step T1, first input data memory bank DM0 transmits the first input data value to first computation module CM0 in accordance with operation IN0 of the program, and second computation module CM1 requests a second input data value from second input data memory bank DM1 in accordance with operation RQ1 of the program.

In a third time step T3 immediately subsequent to the second time step T2, first computation module CM0 performs a mathematical operation on the first input data value to produce a first resultant data value in accordance with operation CP0 of the program and transmits the first resultant data value to second computation module CM1, second input data memory bank DM1 transmits the second input data value to second computation module CM1 in accordance with operation IN1 of the program, and third computation module CM2 requests a third input data value from third input data memory bank DM2 in accordance with operation RQ2 of the program.

In a fourth time step T4 immediately subsequent to the third time step T3, second computation module CM1 performs a mathematical operation on the second input data value to produce a second resultant data value and adds the first resultant data value to the second resultant data value to produce a first sum value in accordance with operation CP1 of the program, and transmits the first sum value to third computation module CM2, and third input data memory bank DM2 transmits the third input data value to third computation module CM2 in accordance with operation IN2 of the program. Operation RQ1 was delayed until second time step T2 so that the second input data value and the first resultant data value would arrive at second computation module CM1 during the same clock period.

In a fifth time step T5 immediately subsequent to the fourth time step T4, third computation module CM2 performs a mathematical operation on the third input data value to produce a third resultant data value and adds the first sum value to the third resultant data value to produce a second sum value in accordance with operation CP2 of the program, and transmits the second sum value to third accumulation memory bank AM2. Operation RQ2 was delayed until third time step T3 so that the third input data value and the second resultant data value would arrive at third computation module CM2 during the same clock period.

In a sixth time step T6 immediately subsequent to the fifth time step T5, third accumulation memory bank AM2 stores the second sum value received from third computation module CM2 in accordance with operation RS0 of the program.

Figure 9:
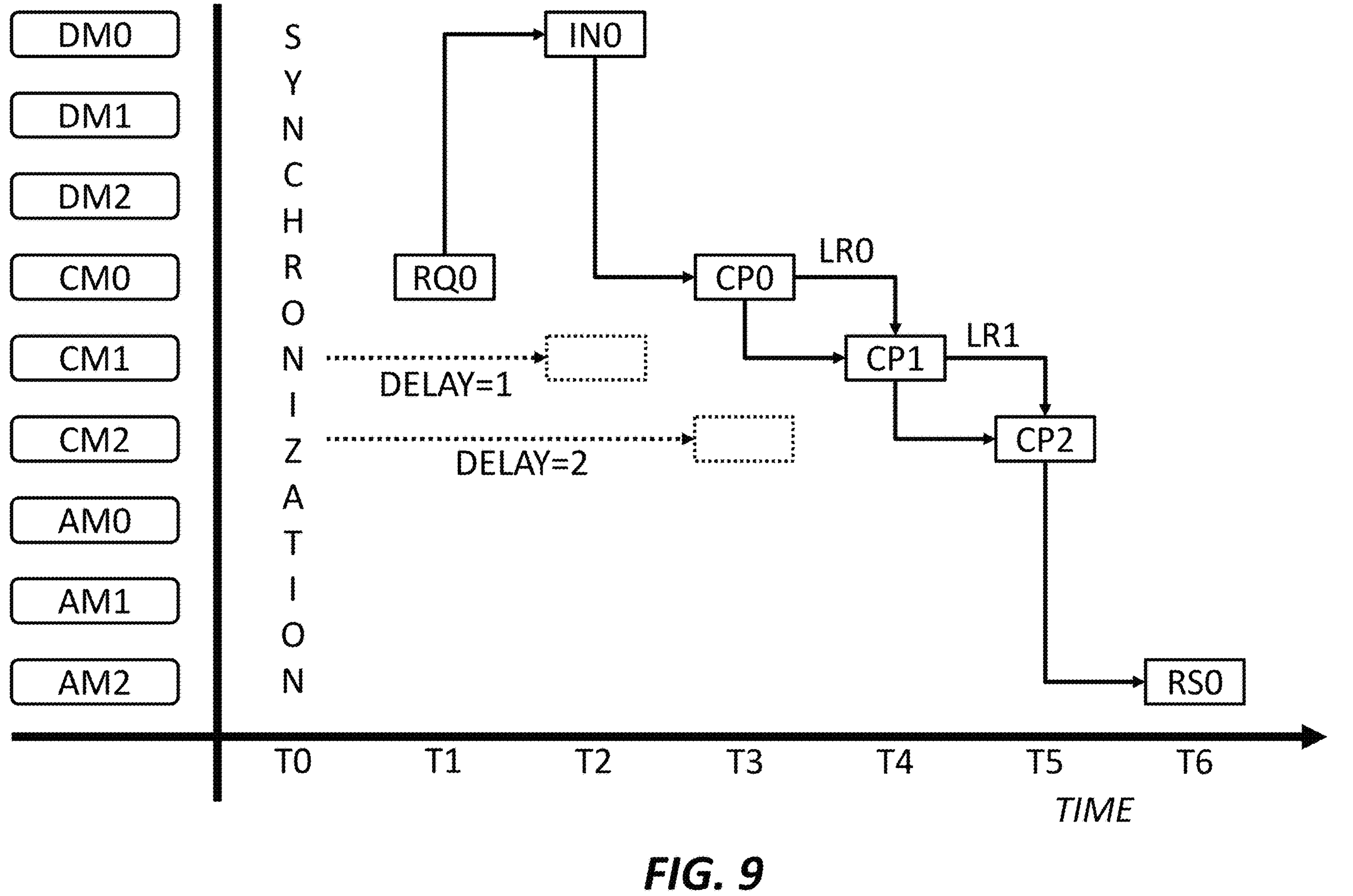
FIG. 9 is a timeline of a program for neural network hardware acceleration in which kernel row parallelism is performed, according to at least one embodiment of the present invention.

FIG. 9 is a timeline of a program for neural network hardware acceleration in which kernel row parallelism is performed, according to at least one embodiment of the present invention. In at least some embodiments, a controller of an integrated circuit receives the program from a host computer, and transmits instructions of the program to a plurality of computation modules, which execute the program along with the controller to perform neural network inference. The timeline is arranged in steps of time from T0 to T6. Each step of TO, T1, T2, T3, T4, T5, and T6 represents one or more clock periods of an integrated circuit. The integrated circuit includes at least a first input data memory bank DM0, a second input data memory bank DM1, a third input data memory bank DM2, a first computation module CM0, a second computation module CM1, a third computation module CM2, a first accumulation memory bank AM0, a second accumulation memory bank AM1, and a third accumulation memory bank AM2. At each step of time, one or more elements of the integrated circuit perform operations.

In an initial time step TO, a synchronization operation is performed. In at least some embodiments, the synchronization operation includes adjusting timing of the elements of the integrated circuit so that the elements perform operations in synchronization with the clock period of each step of time.

In a first time step T1, first computation module CM0 requests a first input data value, a second input data value, and a third input data value from first input data memory bank DM0 in accordance with operation RQ0 of the program.

In a second time step T2 immediately subsequent to the first time step T1, first input data memory bank DM0 transmits the first input data value, the second input data value, and the third input data value to first computation module CM0 in accordance with operation IN0 of the program. During second time step T2, a line register of first computation module CM0 receives the first input data value, the second input data value, and the third input data value during different clock periods within time step T1. The line register of first computation module CM0 transmits the first input data value to a processor of first computation module CM0.

In a third time step T3 immediately subsequent to the second time step T2, first computation module CM0 performs a mathematical operation on the first input data value to produce a first resultant data value in accordance with operation CP0 of the program, an adder of first computation module CM0 transmits the first resultant data value to an adder of second computation module CM1, and the line register of first computation module CM0 transmits the second input data value and the third input data value to a line register of second computation module CM1. The line register of second computation module CM1 transmits the second input data value to a processor of second computation module CM1. Because the line register of first computation module CM0 transmits the second input data value to the line register of second computation module CM1, second computation module CM1 does not need to request the second input data value during second time step T2, and no operation is required for an input data memory bank to transmit the second input data value to second computation module CM1 during third time step T3, thereby potentially reducing energy consumption in performing neural network inference.

In a fourth time step T4 immediately subsequent to the third time step T3, second computation module CM1 performs a mathematical operation on the second input data value to produce a second resultant data value in accordance with operation CP1 of the program, the adder of second computation module CM1 adds the first resultant data value to the second resultant data value to produce a first sum value, the adder of second computation module CM1 transmits the first sum value to an adder of third computation module CM2, and the line register of second computation module CM1 transmits the third input data value to a line register of third computation module CM2. Because the line register of first computation module CM0 transmits the third input data value to the line register of second computation module CM1, which then transmits the third input data value to the line register of third computation module CM2, third computation module CM2 does not need to request the third input data value during third time step T3, and no operation is required for an input data memory bank to transmit the third input data value to third computation module CM2 during fourth time step T4, thereby potentially reducing energy consumption in performing neural network inference.

In a fifth time step T5 immediately subsequent to the third time step T4, third computation module CM2 performs a mathematical operation on the third input data value to produce a third resultant data value in accordance with operation CP2 of the program, the adder of third computation module CM2 adds the first sum value to the third resultant data value to produce a second sum value, and third computation module CM2 transmits the second sum value to third accumulation memory bank AM2.

In a sixth time step T6 immediately subsequent to the fifth time step T5, third accumulation memory bank AM2 stores the second sum value received from third computation module CM2 in accordance with operation RS0 of the program.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, neural network hardware acceleration via sequentially connected computation modules is performed by an integrated circuit including a memory configured to store values and to transmit stored values, and a plurality of sequentially connected computation modules. Each computation module among the plurality of sequentially connected computation modules includes a processor and an adder. The processor includes circuitry configured to receive an input data value and a weight value from the memory, and perform a mathematical operation on the input data value and the weight value to produce a resultant data value. The processor is connected to the memory through a memory interconnect. The adder includes circuitry configured to receive the resultant data value directly from the processor, receive one of a preceding resultant data value and a preceding sum value directly from a preceding adder of a preceding computation module among the plurality of sequentially connected computation modules, add the resultant data value to the one of the preceding resultant data value and the preceding sum value to produce a sum value, and transmit one of the resultant data value and the sum value to the memory or directly to a subsequent adder of a subsequent computation module among the plurality of sequentially connected computation modules. The adder is directly connected to the processor, the preceding adder, and the subsequent adder, and is connected to the memory through the memory interconnect.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. An integrated circuit comprising:
- a memory configured to store values and to transmit stored values; and
- a plurality of sequentially connected computation modules, each computation module among the plurality of sequentially connected computation modules including:
  - a processor including circuitry configured to
    - receive an input data value and a weight value from the memory,
    - perform a mathematical operation on the input data value and the weight value to produce a resultant data value,
    - wherein the processor is connected to the memory through a memory interconnect,
  - an adder including circuitry configured to
    - receive the resultant data value directly from the processor,
    - receive one of a preceding resultant data value and a preceding sum value directly from a preceding adder of a preceding computation module among the plurality of sequentially connected computation modules,
    - add the resultant data value to the one of the preceding resultant data value and the preceding sum value to produce a sum value, and
    - transmit one of the resultant data value and the sum value to the memory or directly to a subsequent adder of a subsequent computation module among the plurality of sequentially connected computation modules,
    - wherein the adder is directly connected to the processor, the preceding adder, and the subsequent adder, and is connected to the memory through the memory interconnect; and
  - a line register including circuitry configured to
    - receive the input data value from the memory and directly from a preceding line register of the preceding computation module, and
    - transmit the input data value directly to the processor and a subsequent line register of the subsequent computation module,
    - wherein the line register is directly connected to the processor, the preceding line register, and the subsequent line register, and is connected to the memory through the memory interconnect.

2. The integrated circuit of claim 1, wherein each computation module among the plurality of sequentially connected computation modules further includes
- a sequencer including circuitry configured to cause the processor and adder to transmit, receive, and perform operations according to a program.

3. The integrated circuit of claim 2, further comprising:
- a controller including circuitry configured to
  - receive the program from a host computer, and
  - transmit the program to the sequencer of each computation module among the plurality of sequentially connected computation modules,
  - wherein the program includes instructions to perform neural network inference.

4. The integrated circuit of claim 1, wherein each computation module among the plurality of sequentially connected computation modules further includes
- a synchronization unit including circuitry configured to synchronize a data reading operation with a subsequent synchronization unit of the subsequent computation module, whereby the processor and a subsequent processor of the subsequent computation module receive one of the input data value and the weight value in a single transmission from the memory within a single clock period.

5. The integrated circuit of claim 1, wherein the memory includes a plurality of memory banks, and the memory interconnect selectively connects a memory bank among the plurality of memory banks to a computation module among the plurality of sequentially connected computation modules or a host computer.

6. The integrated circuit of claim 1, wherein the sequencer of each computation module among the plurality of sequentially connected computation modules further includes circuitry configured to cause the line register to transmit and receive according to the program.

7. The integrated circuit of claim 2, wherein the program includes instructions to perform neural network inference.

8. The integrated circuit of claim 7, wherein the controller includes circuitry further configured to, in accordance with the program, cause the memory to store a first input data value received from the host computer in a first memory bank among a plurality of memory banks of the memory, cause the memory to store a second input data value received from the host computer in a second memory bank among the plurality of memory banks of the memory, cause the memory to store the weight value received from the host computer in a third memory bank among the plurality of memory banks of the memory.

9. The integrated circuit of claim 7, wherein the controller includes circuitry further configured to, in accordance with the program, cause, in a first time step, a first computation module to request a first input data value and a second input data value from a first memory bank among the plurality of memory banks of the memory, cause, in a second time step immediately subsequent to the first time step, the first memory bank to transmit the first input data value and the second input data value to the first computation module, cause, in a third time step immediately subsequent to the second time step, the first computation module to perform a mathematical operation on the first input data value to produce a first resultant data value, a first adder of the first computation module to transmit the first resultant data value to a second adder of the second computation module, and a first line register of the first computation module to transmit the second input data value to a second line register of the second computation module, and cause, in a fourth time step immediately subsequent to the third time step, the second computation module to perform a mathematical operation on the second input data value to produce a second resultant data value, the second computation module to add the first resultant data value to the second resultant data value to produce a first sum value, and the second computation module to transmit the first sum value to the memory, and cause, in a fifth time step immediately subsequent to the fourth time step, the memory to store the first sum value received from the second computation module in a second memory bank among the plurality of memory banks of the memory.

10. The integrated circuit of claim 1, wherein the processor is configured to perform point-wise convolution or depth-wise convolution.

11. An integrated circuit comprising:

a memory configured to store values and to transmit stored values; and a plurality of sequentially connected computation modules, each computation module among the plurality of sequentially connected computation modules including:

a processor including circuitry configured to receive an input data value and a weight value from the memory, perform a mathematical operation on the input data value and the weight value to produce a resultant data value, wherein the processor is connected to the memory through a memory interconnect, and an adder including circuitry configured to receive the resultant data value directly from the processor, receive one of a preceding resultant data value and a preceding sum value directly from a preceding adder of a preceding computation module among the plurality of sequentially connected computation modules, add the resultant data value to the one of the preceding resultant data value and the preceding sum value to produce a sum value, and transmit one of the resultant data value and the sum value to the memory or directly to a subsequent adder of a subsequent computation module among the plurality of sequentially connected computation modules, wherein the adder is directly connected to the processor, the preceding adder, and the subsequent adder, and is connected to the memory through the memory interconnect;

a sequencer including circuitry configured to cause the processor and adder to transmit, receive, and perform operations according to a program including instructions to perform neural network inference; and a controller including circuitry further configured to, in accordance with the program, cause, in a first time step, a first computation module to request a first input data value from a first memory bank among the plurality of memory banks of the memory, cause, in a second time step immediately subsequent to the first time step, the first memory bank to transmit the first input data value to the first computation module, and a second computation module to request a second input data value from a second memory bank among the plurality of memory banks of the memory, cause, in a third time step immediately subsequent to the second time step, the first computation module to perform a mathematical operation on the first input data value to produce a first resultant data value, the first computation module to transmit the first resultant data value to the second computation module, and the second memory bank to transmit the second input data value to the second computation module, and cause, in a fourth time step immediately subsequent to the third time step, the second computation module to perform a mathematical operation on the second input data value to produce a second resultant data value, the second computation module to add the first resultant data value to the second resultant data value to produce a first sum value, and the second computation module to transmit the first sum value to the memory, and cause, in a fifth time step immediately subsequent to the fourth time step, the memory to store the first sum value received from the second computation module in a fourth memory bank among the plurality of memory banks of the memory.

12. A portion of integrated circuitry comprising:

a first input data path connectable to a memory, a processor directly connected to the first input data path, the processor including circuitry configured to perform a convolution operation, a second input data path directly connectable to a preceding adder, an adder directly connected to the processor and the second input data path, the adder including circuitry configured to add, a first output data path directly connected to the adder and connectable to the memory, a second output data path directly connected to the adder and directly connectable to a subsequent adder, a first bidirectional control path directly connectable to a preceding sequencer, a sequencer directly connected to the first bidirectional control path, the sequencer including circuitry configured to transmit signals to the processor and adder according to a program, and a second bidirectional control path directly connectable to a subsequent sequencer, a third input data path connectable to the memory, a fourth input data path directly connectable to a preceding line register, a line register directly connected to the third input data path and the fourth input data path, and a third output data path directly connected to the line register and connectable to a subsequent line register.

13. The portion of integrated circuitry of claim 12, wherein the sequencer further includes a synchronization unit including circuitry configured to transmit and receive signals through the first bidirectional control path and the second bidirectional control path in order to synchronize a data reading operation with at least one of a preceding synchronization unit or a subsequent synchronization unit, whereby the processor and at least one of a preceding processor and subsequent processor receive a single transmission from the memory within a single clock period.

14. The portion of integrated circuitry of claim 12, wherein the program includes instructions to perform neural network inference by instructing the sequencer to cause, in a first time step, the processor to request a first input data value from a first memory bank among a plurality of memory banks of the memory, cause, in a second time step immediately subsequent to the first time step, the adder to receive a first resultant data value from a preceding computation module, and the processor to receive a first input data value from the first memory bank, cause, in a third time step immediately subsequent to the second time step, the processor to perform a mathematical operation on the first input data value to produce a second resultant data value, the adder to add the first resultant data value to the second resultant data value to produce a first sum value, and the adder to transmit the first sum value to the memory.

* * * * *